(12) United States Patent
Wilson

(10) Patent No.: US 7,136,383 B1
(45) Date of Patent: *Nov. 14, 2006

(54) REDIRECTION TO A VIRTUAL ROUTER

(75) Inventor: Ian Wilson, Edinburgh (GB)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/083,727

(22) Filed: Mar. 18, 2005

Related U.S. Application Data

(63) Continuation of application No. 09/748,828, filed on Dec. 26, 2000, now Pat. No. 6,885,667.

(51) Int. Cl.
 *H04L 12/28* (2006.01)
 *H04L 12/56* (2006.01)

(52) U.S. Cl. ............................................. 370/392

(58) Field of Classification Search ........ 370/389–395, 370/351, 535, 331, 401–402, 219, 229, 400; 709/245, 244, 202, 230, 231
See application file for complete search history.

(56) References Cited

U.S. PATENT DOCUMENTS

| | | | |
|---|---|---|---|
| 4,692,918 A | 9/1987 | Elliott et al. | 370/85 |
| 5,016,244 A | 5/1991 | Massey et al. | 370/16 |
| 5,018,133 A | 5/1991 | Tsukakoshi et al. | 340/825.05 |
| 5,218,600 A | 6/1993 | Schenkyr et al. | 370/16 |
| 5,371,852 A | 12/1994 | Attanasio et al. | 395/200 |
| 5,473,599 A * | 12/1995 | Li et al. | 370/219 |
| 5,572,528 A | 11/1996 | Shuen | 370/85.13 |
| 5,619,552 A | 4/1997 | Karppanen et al. | |
| 5,729,537 A | 3/1998 | Billström | 370/329 |
| 5,793,763 A | 8/1998 | Mayes et al. | |
| 5,825,759 A | 10/1998 | Liu | 370/331 |
| 5,835,696 A | 11/1998 | Hess | |
| 5,862,345 A | 1/1999 | Okanoue et al. | 709/238 |
| 5,862,451 A | 1/1999 | Grau et al. | |

(Continued)

OTHER PUBLICATIONS

PCT International Search Report with written opinion, Application No. PCT/US2004/019617, Int'l filing date Jun. 18, 2004, mailed Jul. 10, 2004.

(Continued)

*Primary Examiner*—Chi Pham
*Assistant Examiner*—Prenell Jones
(74) *Attorney, Agent, or Firm*—Beyer Weaver & Thomas LLP

(57) ABSTRACT

Methods and apparatus for sending a redirect packet to a host are disclosed. In a first router that supports a virtual router protocol, a method of sending a redirect packet to a host, the redirect packet notifying the host that specific packets are to be redirected to a second router, includes receiving a packet from a host, the packet including a source address identifying the host and a destination address identifying a destination network. The first router ascertains the destination network of the packet from the destination address and obtains from a routing table an address of a next router to the packet's destination network. The first router then determines whether to send a redirect packet to the host. In accordance with one embodiment, this is performed by determining whether the next router and the host identified by the source address of the packet are on the same network. When it is determined that the next router and the host are on the same network, the first router composes and sends the redirect packet to the host. The redirect packet serves to notify the host that packets addressed to the destination network are to be redirected to a virtual address of the next router.

16 Claims, 4 Drawing Sheets

U.S. PATENT DOCUMENTS

| | | | |
|---|---|---|---|
| 5,943,604 | A | 8/1999 | Chen et al. |
| 5,949,753 | A | 9/1999 | Alexander, Jr. et al. |
| 5,982,745 | A | 11/1999 | Wolff et al. |
| 5,999,536 | A | 12/1999 | Kawafuji et al. |
| 6,078,575 | A | 6/2000 | Dommety et al. .......... 370/338 |
| 6,195,705 | B1 | 2/2001 | Leung |
| 6,230,326 | B1 | 5/2001 | Unger et al. |
| 6,236,678 | B1 | 5/2001 | Horton et al. |
| 6,295,276 | B1 | 9/2001 | Datta et al. |
| 6,298,063 | B1* | 10/2001 | Coile et al. ................. 370/401 |
| 6,389,027 | B1 | 5/2002 | Lee et al. |
| 6,397,260 | B1 | 5/2002 | Wils et al. |
| 6,449,250 | B1 | 9/2002 | Otani et al. |
| 6,487,605 | B1* | 11/2002 | Leung ........................ 709/245 |
| 6,510,162 | B1 | 1/2003 | Fijolck et al. |
| 6,556,591 | B1 | 4/2003 | Bernnath et al. |
| 6,611,868 | B1 | 8/2003 | Arutyunov |
| 6,650,624 | B1 | 11/2003 | Quigley et al. |
| 6,650,641 | B1* | 11/2003 | Albert et al. ............... 370/392 |
| 6,751,191 | B1 | 6/2004 | Kanekar et al. |
| 6,839,829 | B1 | 1/2005 | Daruwalla et al. |
| 6,885,667 | B1* | 4/2005 | Wilson ....................... 370/392 |
| 2003/0037165 | A1 | 2/2003 | Shinomiya et al. |
| 2005/0111352 | A1* | 5/2005 | Ho et al. .................... 370/219 |

OTHER PUBLICATIONS

Release notes for 3Com Corporation, "Conducting a Redundant Route for Network Resiliency," Mar. 1994, *NET Builder Family Bridge/Router* pp. 26-29.

J. Moy, RFC 1247 "OSPF Version 2," Jul. 19, 1991.

D. Oran, RFC 1142 "OSI IS-IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998, Network Working Group.

Chambless, et al., "Home Agent Redundancy Protocol (HARP)," Oct. 27, 1997.

Network Working Group, RFC 2002 "IP Mobility Support," Oct. 1996.

K. Egevang et al., "The IP Network Address Translator (NAT)", Network Working Group, pp. 1-10, May 1994.

Y. Rekhter, et al, "*Address Allocation for Private Internets*," RFC: 1918, Network Working Group, Feb. 1996, 9 Pages.

P. Srisuresh, et al, "*Load Sharing Using IP Network Address Translation (LSNAT)*," RFC: 2391, Network Working Group, Aug. 1998, 18 Pages.

P. Srisuresh, et al, "*IP Network Address Translator (NAT) Terminology and Considerations ,*" RFC: 2663, Network Working Group, Aug. 1999, 30 Pages.

E. Gerich, "*Guidelines for Management of IP Address Space*," RFC: 1466, Network Working Group, May 1993, 10 Pages.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

Zang, et al. "Method for a Cable Modem to Rapidly Switch to a Backup CMTS," U.S. Appl. No. 09/484,611, filed Jan. 18, 2000, 53 Pages.

Zang, et al. "Cable Network Redundancy Architecture," U.S. Appl. No. 09/484,612, filed Jan. 18, 2000, 60 Pages.

Nosella, et al. "Gateway Load Balancing Protocol," U.S. Appl. No. 09/883,674, filed Jun. 18, 2001, 48 Pages.

Denny, et al. "Stateful Network Address Translation Protocol Implemented Over a Data Network," U.S. Appl. No. 09/735,199, filed Dec. 11, 2000, 67 Pages.

Leung, et al. "Robust HA Redundancy and Load Balancing," U.S. Appl. No. 10/008,494, filed Nov. 9, 2001, 53 Pages.

\* cited by examiner

Redirect:

REDIRECTION TO A VIRTUAL ROUTER

RELATED APPLICATIONS

This application is a continuation of application Ser. No. 09/748,828, entitled "Redirection to a Virtual Router," which was filed on Dec. 26, 2000 now U.S. Pat. No. 6,885,667, which is incorporated herein by reference for all purposes.

BACKGROUND OF THE INVENTION

1. Field of the Invention

The present invention relates to networking technology. More particularly, the present invention relates to providing ICMP redirects in a router implementing a virtual router protocol.

2. Description of the Related Art

Networks are commonly used by organizations for a variety of purposes. For instance, through the use of networks, resources such as programs and data may be shared by users of the network. In addition, a computer network can serve as a powerful communication medium among widely separated users.

Communication among hosts and users of a network is often facilitated through connection to one or more routers. As shown in FIG. 1, a host 112 normally resides on a network segment 114 that enables its network entities to communicate with other entities or networks. Note that the host 112 need not directly connect to the entities or networks with which it communicates. For example, as shown in FIG. 1, the host 112 may be connected through one of several routers R1 116, R2 118, or R3 120.

Now, suppose that the host 112 wishes to send a message to a corresponding node 122. A message from the host 112 is then packetized and forwarded through router R1 116 and to the corresponding node 122 according to a standard protocol. If the corresponding node 122 wishes to send a message to the host 112—whether in reply to a message from the host 112 or for any other reason—it addresses that message to the IP address of the host 112 on the network segment 114. The packets of that message are then forwarded to router R1 116 and ultimately to the host 112.

As described above, packets sent to and from the corresponding node 122 are forwarded via the router R1 116. As shown, the router R1 116 is the only route to and from the corresponding node 122. Thus, if the router R1 116 fails, communication with the corresponding node 122 becomes impossible. Accordingly, the reliability of the network as well as the routers in the network is of utmost importance.

As networks become a critical resource in many organizations, it is important that the networks are reliable. One way of achieving reliability is through redundancy. As described above, a single router failure may prevent communication to and from each host and user connected to the router. In many networks, it is common to provide redundancy through the use of multiple routers such that a backup router functions in the event of failure of a primary router. This is accomplished through the use of a virtual router protocol such as the Virtual Router Redundancy Protocol (VRRP) or the Hot Standby Redundancy Protocol (HSRP). HSRP is further described in U.S. Pat. No. 5,473,599.

According to HSRP, a protocol available from Cisco Systems, Inc. located in San Jose, Calif., multiple routers share a common MAC address and a virtual IP address. In addition, each of the routers has its own unique MAC address that will be used by the router for advertising routes to other routers. A router may be in one of three states according to HSRP: an active state, a standby state, and a listen state. When a router is in the active state, the router is responsible for actively forwarding packets addressed to the virtual IP address. Similarly, when a router is in the standby state, the router becomes active when the active router becomes non-functional. Thus, when the active router fails, the standby router takes over both the shared virtual IP address and the shared MAC address. A router that is in the listen state merely listens to packets that are sent to it and collects this information in the event that it later becomes an active or standby router.

As shown in FIG. 2, a system diagram illustrates the state of each router in accordance with the HSRP protocol. In this example, a network segment "Net C" 124 is connected to the second router R2 118 and the third router R3 120. When the host 112 wishes to send a packet to the subnet "Net C" 124, it may send the packet via the second router R2 118 or the third router R3 120. The Internet Control Message Protocol (ICMP), described in RFC 792 of the Network Working Group, J. Postel, September 1981, may be used to notify the host that the optimal path to the subnet 124 is via the second router R2 118. More particularly, when a gateway such as router R1 116 receives a packet, it checks its routing table to obtain the address of the next hop, or next gateway, router R2 118. If the second router R2 118 and the host 112 are on the same network, a redirect message is sent to the host 112. The redirect message advises the host 112 to send its traffic for Network C directly to the second router R2 118 since this is a shorter path to the destination. This is accomplished by specifying the IP address of the second router R2 118 in the redirect message.

While the use of an ICMP redirect message may be used to notify a router of the optimal path to a particular destination, the ICMP redirect feature is typically disabled when a virtual router protocol such as HSRP is enabled. For example, as described above with reference to FIG. 2, a redirect message may be sent to the host 112 indicating that the optimal path to the subnet C is via the second router R2 118. Once the host 112 has discovered the IP address of the second router R2 118, it will automatically address each packet sent to the subnet C to the second router R2 118. It follows that when the second router R2 118 fails, packets sent to the second router R2 118 will never be received by the intended destination. Although the HSRP protocol is designed to send the packet via the alternate route to the subnet C 124 through the third router R3 120 upon failure of the second router R2 118, the ICMP redirect feature prevents the redundancy feature from functioning properly. Thus, although the redundancy feature is designed to ensure that the packet is received by its intended destination, the packet will not necessarily be received by its intended destination when the ICMP redirect feature is enabled. For this reason, the ICMP redirect feature is typically disabled when the HSRP protocol is enabled.

While disabling the ICMP redirect feature may be desirable in certain instances, disabling the ICMP redirect feature is problematic on networks where different routers (and/or HSRP groups) provide different routes to remote networks. More particularly, packets sent to devices on remote networks for which the HSRP active router does not provide the optimal route will traverse the local network twice since the active router must forward them to the optimal path router.

In view of the above, it would be desirable to enable a redirect feature such as the ICMP redirect feature to be used with a virtual router protocol such as HSRP. In this manner, a packet may be sent via an optimal path while retaining the redundancy features of a virtual router protocol.

SUMMARY OF THE INVENTION

The present invention enables a redirect packet to be sent in a system that implements a virtual router protocol. This is accomplished, in part, by providing a virtual IP address in the redirect packet rather than a primary IP address. In this manner, a host may be notified that packets are to be redirected to the virtual IP address.

In accordance with one aspect of the invention, the present invention provides methods and apparatus for sending a redirect packet to a host from a first router that supports a virtual router protocol. The redirect packet notifies the host that specific packets are to be redirected to a second router. One method includes receiving a packet from a host, where the packet includes a source address identifying the host and a destination address identifying a destination network. The first router ascertains the destination network of the packet from the destination address and obtains from a routing table an address of a next router to the packet's destination network. The first router then determines whether to send a redirect packet to the host. In accordance with one embodiment, this is performed by determining whether the next router and the host identified by the source address of the packet are on the same network. When it is determined that the next router and the host are on the same network, the first router composes and sends the redirect packet to the host. The redirect packet serves to notify the host that packets addressed to the destination network are to be redirected to a virtual address of the next router.

In accordance with another aspect of the invention, the first router determines whether to send a redirect packet containing a primary IP address of the second router or containing a virtual IP address of the second router, where the virtual IP address is associated with one or more routers. When it is determined to send a redirect packet to the primary IP address of the second router, a redirect packet is composed indicating that packets to be sent to a specific network are to be redirected to the primary IP address of the second router. When it is determined to send a redirect packet to the virtual IP address of the second router, a redirect packet is composed indicating that packets to be sent to the specific network are to be redirected to the virtual IP address of the second router. The redirect packet is then sent to the host.

The second router can be in one of three conditions from the point of view of the first router. These three conditions determine what the first router does with the ICMP redirect message. First, the second router may have HSRP configured and is active for at least one HSRP group. In this instance, the redirect message is sent. The redirect message contains the virtual IP address of the second router as the next router. Second, the second router may have HSRP configured, but is not active. In this instance, the redirect message is not sent. Third, the second router does not have HSRP configured. In this instance, the redirect message is sent. The redirect message contains the primary IP address of the second router as the next router.

In accordance with another aspect of the invention, when it is determined that the second router is not an active router for the virtual router protocol, a redirect packet is not sent to the host.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

As described above, when a redirect message is received by a router that supports a virtual router protocol, the redirect message may defeat the purpose of that the virtual router protocol. More particularly, when a redirect packet (e.g., ICMP redirect) is typically sent, it provides an IP address of a router. In other words, when a virtual router protocol such as HSRP is running on the router, a primary IP address of the router rather than the virtual IP address is typically provided. As a result, the redirect feature is typically disabled when a virtual router protocol such as HSRP is in use.

Figure 1:
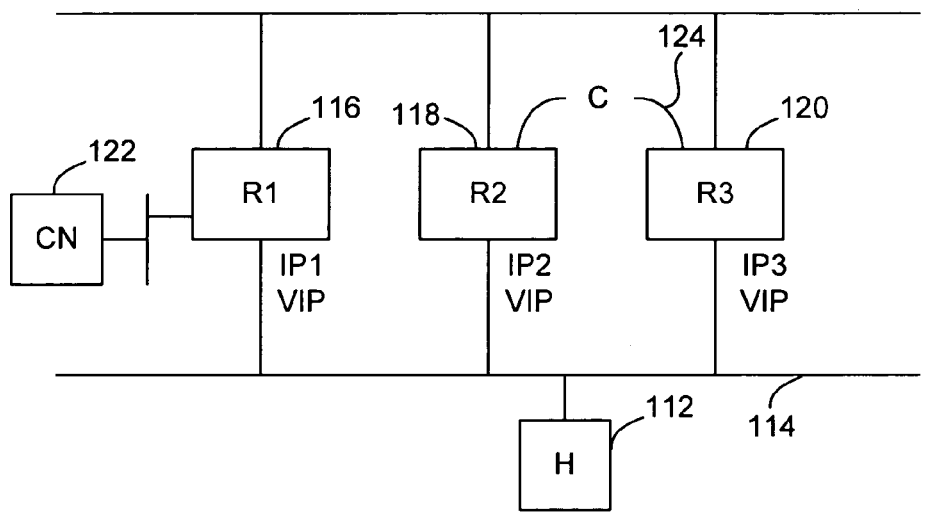
FIG. 1 is a diagram illustrating communication between a host and a corresponding node via a router.
Figure 2:
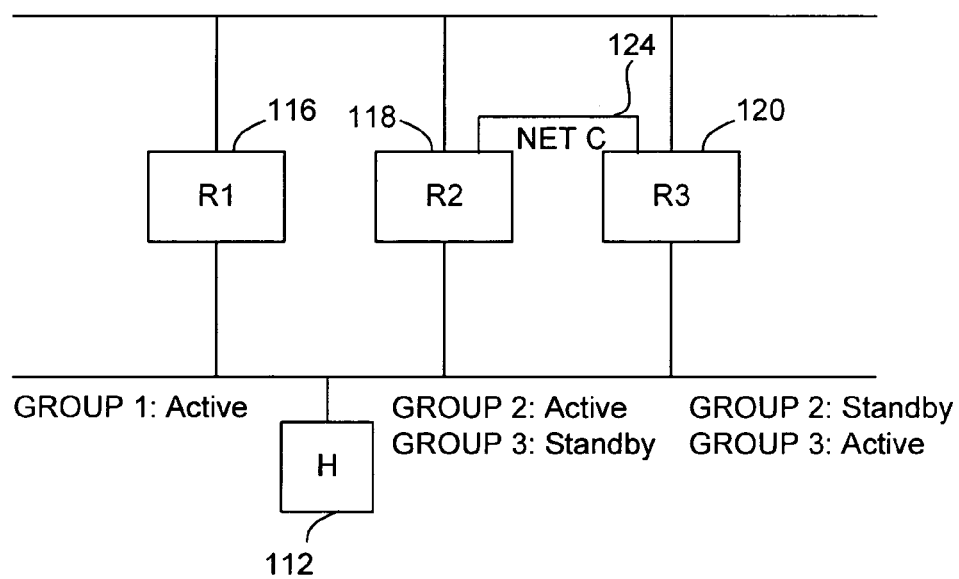
FIG. 2 is a diagram illustrating a system in which multiple routers are used to provide redundancy.
Figure 3:
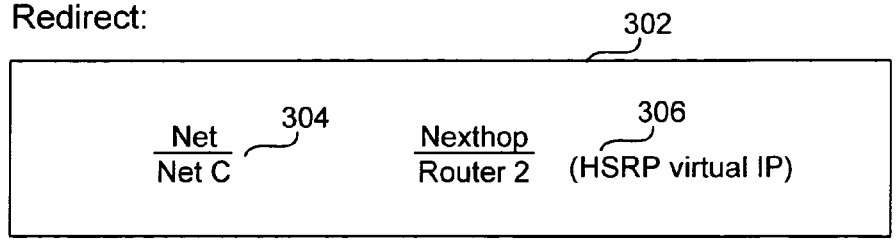
FIG. 3 is a diagram illustrating an exemplary redirect packet that provides a virtual IP address of a router supporting a virtual router protocol in accordance with an embodiment of the invention.

In accordance with the present invention, an improved redirect message provides a virtual IP address of the router to which packets are to be redirected (e.g., an active router for the virtual router protocol). FIG. 3 is a diagram illustrating an exemplary redirect packet that provides a virtual IP address of a router supporting a virtual router protocol in accordance with an embodiment of the invention. As shown, a redirect packet 302 identifies a destination network 304 (e.g., network C) and a next hop router 306 that is identified by a virtual IP address. When the redirect packet is received by the host, the host is notified that packets addressed to the destination network 304 are to be redirected to the virtual IP address 306.

Figure 4:
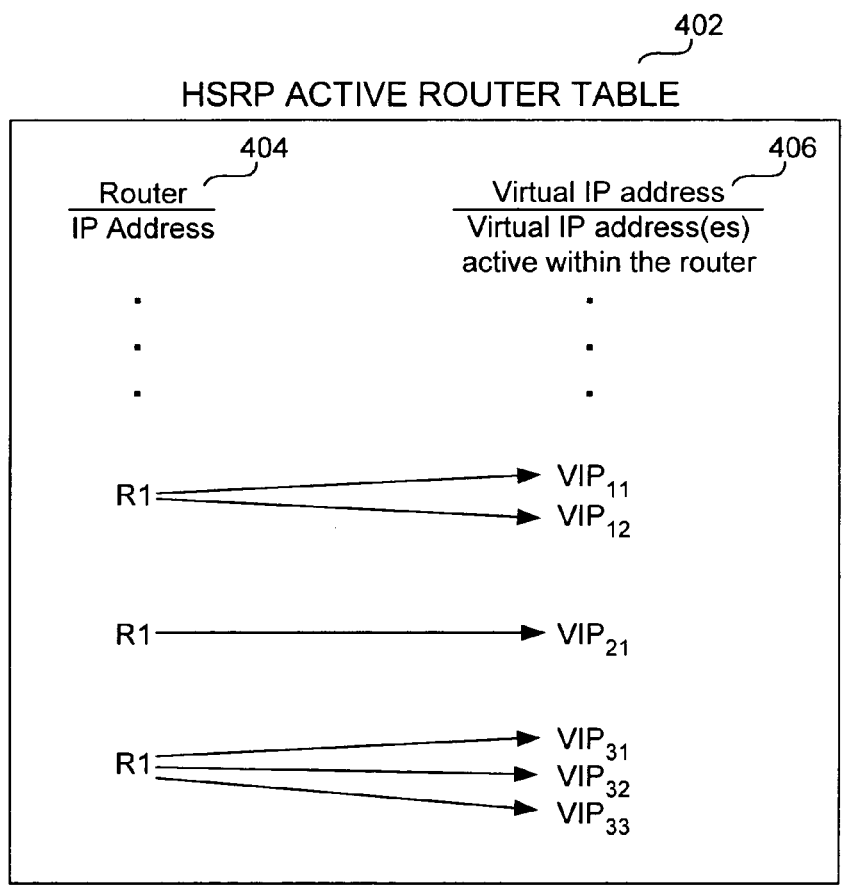
FIG. 4 is a diagram illustrating an exemplary virtual router table that identifies one or more virtual IP addresses for one or more routers in accordance with one embodiment of the invention.

A router may send a redirect packet by accessing a virtual router table that associates one or more virtual IP addresses with each destination router to which packets may be redirected. FIG. 4 is a diagram illustrating an exemplary virtual router table that identifies one or more virtual IP addresses for one or more routers in accordance with one embodiment of the invention. As shown in FIG. 4, a virtual router table 402 may be maintained by each router so that a virtual IP address associated with a particular destination router may be obtained and provided in a redirect packet. As shown, a virtual router table may identify an IP address 404 for a router. For instance, the IP address may be a primary IP address of an active router. One or more virtual IP addresses 406 are then associated with the IP address 404. In this example, a first router R1 is associated with two virtual IP addresses, while a second router R2 is associated with a single virtual IP address. Similarly, a third router R3 is shown to be associated with three virtual IP addresses. Thus, a router sending a redirect packet to a host may notify the host to redirect packets to any one of these virtual IP addresses.

Figure 5:
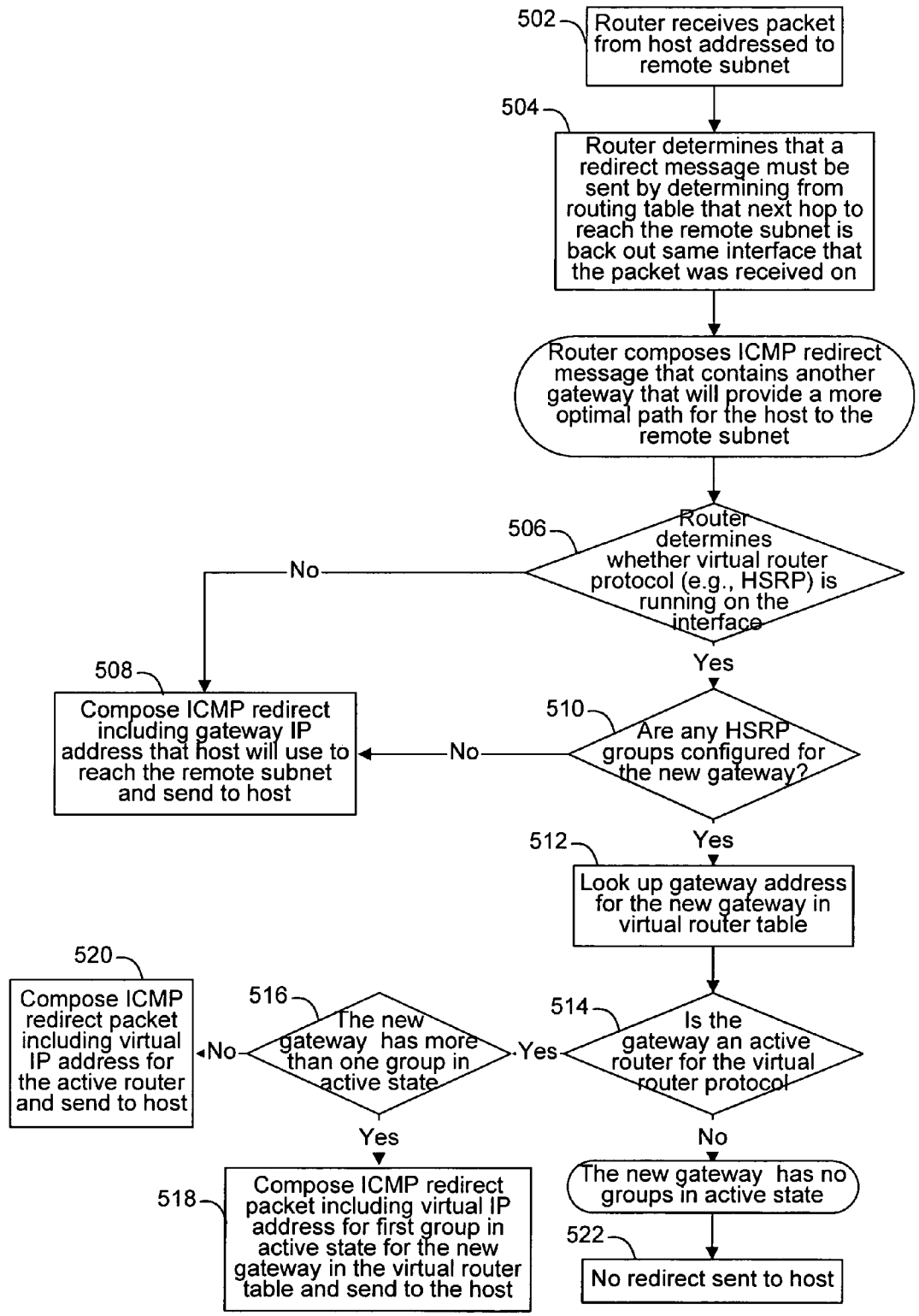
FIG. 5 is a process flow diagram illustrating a method of sending a redirect packet in a router that supports a virtual router protocol.

FIG. 5 is a process flow diagram illustrating a method of sending a redirect packet in a router that supports a virtual router protocol. A first router receives a packet from a host and addressed to a remote subnet at block 502. Since the packet contains a header including a source address identifying the host and a destination address identifying a destination host, the router is able to ascertain the destination network of the packet from the destination address. The router then determines at block 504 whether a redirect message must be sent. More particularly, this is accomplished by obtaining an address of the next hop to the packet's destination network from a routing table. The router then determines whether this next hop router and the host identified by the source address of the packet are on the same network. In other words, the router determines from the routing table that the next hop to reach the remote subnet is back out the same interface that the packet was received on.

When it is determined that the next hop router and the host are on the same network, a redirect packet is composed and sent to notify the host that packets addressed to the destination network are to be redirected to a primary or virtual address of the next hop router. In this manner, the router composes a redirect message such as an ICMP redirect packet that contains another gateway that will provide a more optimal path for the host to the remote subnet. The composition and sending of a redirect message that contains another gateway that will provide a more optimal path to the remote subnet is described in further detail below with reference to blocks 506 through 524.

In accordance with one embodiment, the router determines whether to send a redirect packet to a primary IP address of the next hop router or to a virtual IP address of the next hop router. More particularly, as shown at block 506, the router determines whether a virtual router protocol is running on the router responsible for composing and sending the redirect message. For instance, the router responsible for composing and sending the redirect message may determine whether a virtual router protocol is running on the interface on which the packet was received. If a virtual router protocol is not running on the interface of the router on which the packet was received, a redirect message including a primary IP address of the next hop router is composed and sent to the host as shown at block 508. Otherwise, the router determines at block 510 whether one or more HSRP groups are configured for the next hop router. When it is determined that no HSRP groups are configured for the next hop router, the redirect packet is composed and sent to the primary IP address of the next hop router as described above with reference to block 508. Otherwise, the router performs a look up in a virtual router table at block 512 for a primary IP address of the next hop router.

When the primary IP address of the next hop router is found in the virtual router table, one or more virtual IP addresses may then be obtained. More particularly, the router determines at block 514 whether the next hop router is an active router for the virtual router protocol. When it is determined that the next hop router is an active router for the virtual router protocol, a redirect packet containing a virtual address of the next hop router is composed and sent to the host. More particularly, as described above with reference to FIG. 4, more than one HSRP group of a router may simultaneously be in an active state. Thus, as shown at block 516, when the next hop router has more than one group in an active state, a redirect message including one of the virtual IP addresses is composed and sent to the host. For example, the virtual IP address of the first group in an active state that is found in the virtual router table may be provided in the redirect message. However, when the gateway is not an active router for the virtual router protocol (i.e., the router has no HSRP groups in the active state), a redirect message is not sent to the host as shown at block 522. Thus, a redirect will not be sent if it would result in a host learning a router's primary address.

A software or software/hardware hybrid redirection system is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the redirection systems of this invention may be specially configured routers such as specially configured router models 1600, 2500, 2600, 3600, 4500, 4700, 7200, 7500, and 12000 and Catalyst switches such as models 5000 and 6000 available from Cisco Systems, Inc. of San Jose, Calif. A general architecture for some of these machines will appear from the description given below. In an alternative embodiment, the redirection system may be implemented on a general-purpose network host machine such as a personal computer or workstation. Further, the invention may be at least partially implemented on a card (e.g., an interface card) for a network device or a general-purpose computing device.

Figure 6:
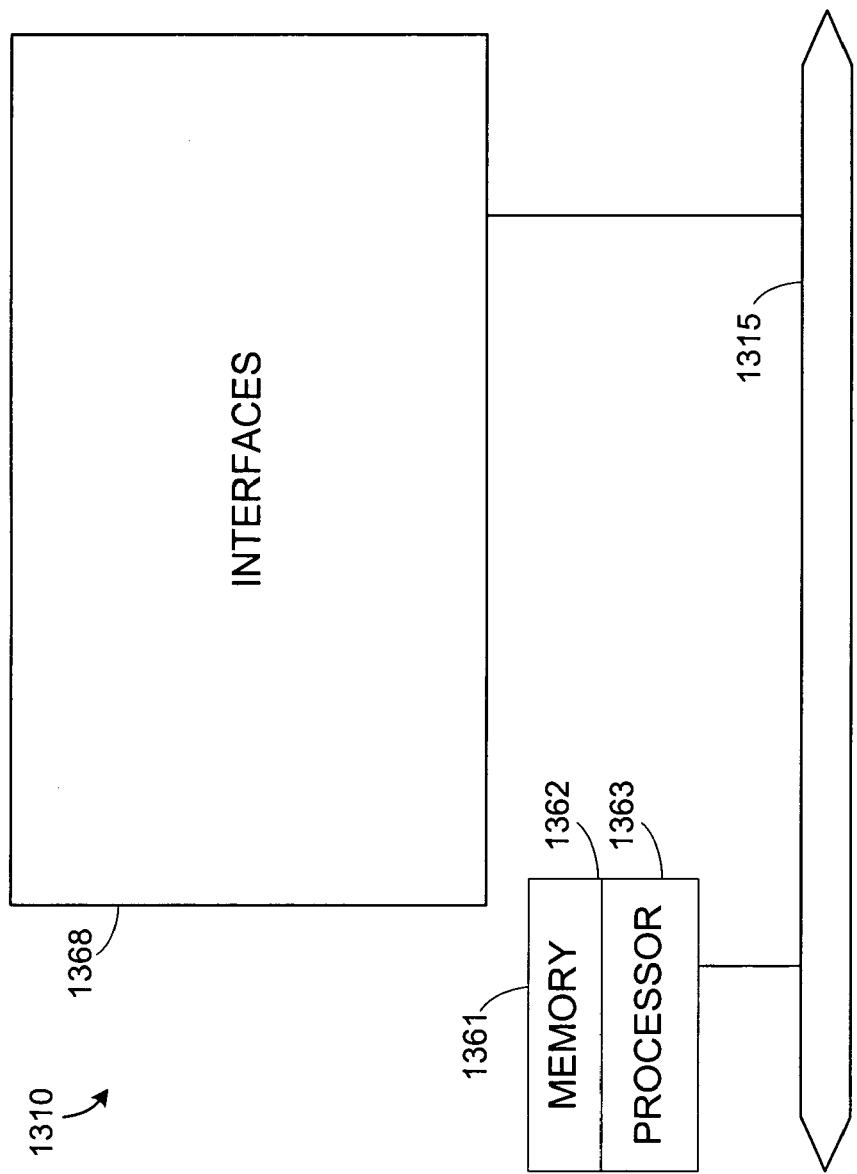
FIG. 6 is a block diagram of a network device that may be configured to implement aspects of the present invention.

Referring now to FIG. 6, a router 1440 suitable for implementing the present invention includes a master central processing unit (CPU) 1462, interfaces 1468, and a bus 1415 (e.g., a PCI bus). When acting under the control of appropriate software or firmware, the CPU 1462 is responsible for such router tasks as routing table computations and network management. It may also be responsible for functions previously described, such as virtual router table databases, modifying tables of the redirecting router, etc. It preferably accomplishes all these functions under the control of software including an operating system (e.g., the Internetwork Operating System (IOS®) of Cisco Systems, Inc.) and any appropriate applications software. CPU 1462 may include one or more processors 1463 such as a processor from the Motorola family of microprocessors or the MIPS family of microprocessors. In an alternative embodiment, processor 1463 is specially designed hardware for controlling the operations of router 1440. In a specific embodiment, a memory 1461 (such as non-volatile RAM and/or ROM) also forms part of CPU 1462. However, there are many different ways in which memory could be coupled to the system.

The interfaces 1468 are typically provided as interface cards (sometimes referred to as "line cards"). Generally, they control the sending and receiving of data packets over the network and sometimes support other peripherals used with the router 1440. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1462 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1461) configured to store program instructions for the general-purpose network operations and other redirection functions described herein. The program instructions may control the operation of an operating system and/or one or more applications, for example. The memory or memories may also be configured to store routing tables, virtual router table databases, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to redirect packets to a virtual router on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. A first router that supports a virtual router protocol, the first router being capable of sending a redirect packet to a host, the redirect packet notifying the host that specific packets are to be redirected to a second router, comprising:
    a processor; and
    a memory, at least one of the processor and the memory being adapted for:
    receiving a packet from the host, the packet including a source address identifying the host and a destination address identifying a destination network;
    ascertaining the destination network of the packet from the destination address;
    obtaining from a routing table an address of a next router that is coupled to the packet's destination network;
    determining whether the next router and the host identified by the source address of the packet are on the same network; and
    when it is determined that the next router and the host are on the same network, composing the redirect packet notifying the host that packets addressed to the destination network are to be redirected to a virtual address of the next router and sending the redirect packet to the host;
    wherein determining whether the next router and the host identified by the source address of the packet are on the same network comprises:
    determining from the routing table that a next hop to reach the destination network is back out the same interface that the packet was received on.

2. A first router that supports a virtual router protocol, the first router being capable of sending a redirect packet to a host, the redirect packet notifying the host that specific packets are to be redirected to a second router, comprising:
    a processor; and
    a memory, at least one of the processor and the memory being adapted for:
    receiving a packet from the host, the packet including a source address identifying the host and a destination address identifying a destination network;
    ascertaining the destination network of the packet from the destination address;
    obtaining from a routing table an address of a next router that is coupled to the packet's destination network;
    determining whether the next router and the host identified by the source address of the packet are on the same network; and
    when it is determined that the next router and the host are on the same network, composing the redirect packet notifying the host that packets addressed to the destination network are to be redirected to a virtual address of the next router and sending the redirect packet to the host and
    replacing an IP address of the next router in the redirect packet with the virtual address of the next router.

3. A first router that supports a virtual router protocol, the first router being capable of sending a redirect packet to a host, the redirect packet notifying the host that specific packets are to be redirected to a second router, comprising:
    a processor; and
    a memory, at least one of the processor and the memory being adapted for:
    receiving a packet from the host, the packet including a source address identifying the host and a destination address identifying a destination network;
    ascertaining the destination network of the packet from the destination address;
    obtaining from a routing table an address of a next router that is coupled to the packet's destination network;
    determining whether the next router and the host identified by the source address of the packet are on the same network; and
    when it is determined that the next router and the host are on the same network, composing the redirect packet notifying the host that packets addressed to the destination network are to be redirected to a virtual address of the next router and sending the redirect packet to the host;

wherein the virtual router protocol is VRRP or HSRP.

4. A first router that supports a virtual router protocol, the first router being capable of sending a redirect packet to a host, the redirect packet notifying the host that specific packets are to be redirected to a second router, comprising:

a processor; and a memory, at least one of the processor and the memory being adapted for:

receiving a packet from the host, the packet including a source address identifying the host and a destination address identifying a destination network;

ascertaining the destination network of the packet from the destination address;

obtaining from a routing table an address of a next router that is coupled to the packet's destination network;

determining whether the next router and the host identified by the source address of the packet are on the same network; and when it is determined that the next router and the host are on the same network, composing the redirect packet notifying the host that packets addressed to the destination network are to be redirected to a virtual address of the next router and sending the redirect packet to the host;

wherein the redirect packet is an ICMP redirect.

5. A first router that supports a virtual router protocol, the first router being adapted for sending a redirect packet to a host, the redirect packet notifying the host that packets to be sent to a particular network are to be redirected to a second router, comprising:

a processor; and a memory, at least one of the processor and the memory being adapted for:

determining whether to send a redirect packet to a primary IP address of the second router or to a virtual IP address of the second router, the virtual IP address being associated with one or more routers;

when it is determined to send a redirect packet to the primary IP address of the second router, composing a redirect packet indicating that packets to be sent to a specific network are to be redirected to the primary IP address of the second router and sending the redirect packet to the host; and when it is determined to send a redirect packet to the virtual IP address of the second router, composing a redirect packet indicating that packets to be sent to the specific network are to be redirected to the virtual IP address of the second router and sending the redirect packet to the host;

wherein the first router implements a virtual router protocol.

6. The first router as recited in claim 5, wherein the virtual router protocol is VRRP or HSRP.

7. A first router that supports a virtual router protocol, the first router being adapted for sending a redirect packet to a host, the redirect packet notifying the host that packets to be sent to a particular network are to be redirected to a second router, comprising:

a processor; and a memory, at least one of the processor and the memory being adapted for:

determining whether to send a redirect packet to a primary IP address of the second router or to a virtual IP address of the second router, the virtual IP address being associated with one or more routers;

when it is determined to send a redirect packet to the primary IP address of the second router, composing a redirect packet indicating that packets to be sent to a specific network are to be redirected to the primary IP address of the second router and sending the redirect packet to the host; and when it is determined to send a redirect packet to the virtual IP address of the second router, composing a redirect packet indicating that packets to be sent to the specific network are to be redirected to the virtual IP address of the second router and sending the redirect packet to the host;

wherein the redirect packet is an ICMP redirect.

8. A first router that supports a virtual router protocol, the first router being adapted for sending a redirect packet to a host, the redirect packet notifying the host that packets to be sent to a particular network are to be redirected to a second router, comprising:

a processor; and a memory, at least one of the processor and the memory being adapted for:

determining whether to send a redirect packet to a primary IP address of the second router or to a virtual IP address of the second router, the virtual IP address being associated with one or more routers;

when it is determined to send a redirect packet to the primary IP address of the second router, composing a redirect packet indicating that packets to be sent to a specific network are to be redirected to the primary IP address of the second router and sending the redirect packet to the host; and when it is determined to send a redirect packet to the virtual IP address of the second router, composing a redirect packet indicating that packets to be sent to the specific network are to be redirected to the virtual IP address of the second router and sending the redirect packet to the host;

wherein determining whether to send a redirect packet to a primary IP address of the second router or to a virtual IP address of the second router comprises:

determining whether a virtual router protocol is running on the first router.

9. The first router as recited in claim 8, wherein determining whether a virtual router protocol is running on the first router comprises:

receiving a packet; and determining whether a virtual router protocol is running on an interface of the first router on which the packet was received.

10. The first router as recited in claim 9, wherein when it is determined that a virtual router protocol is not running on the interface of the first router on which the packet was received, it is determined to send a redirect packet to the primary IP address of the second router.

11. A first router that supports a virtual router protocol, the first router being adapted for sending a redirect packet to a host, the redirect packet notifying the host that packets to be sent to a particular network are to be redirected to a second router, comprising:

a processor; and a memory, at least one of the processor and the memory being adapted for:

determining whether to send a redirect packet to a primary IP address of the second router or to a virtual IP address of the second router, the virtual IP address being associated with one or more routers;

when it is determined to send a redirect packet to the primary IP address of the second router, composing a redirect packet indicating that packets to be sent to a specific network are to be redirected to the primary IP address of the second router and sending the redirect packet to the host; and when it is determined to send a redirect packet to the virtual IP address of the second router, composing a redirect packet indicating that packets to be sent to the specific network are to be redirected to the virtual IP address of the second router and sending the redirect packet to the host;

wherein determining whether to send a redirect packet to a primary IP address of the second router or to a virtual IP address of the second router comprises:

determining whether one or more HSRP groups are configured for the second router; and when it is determined that no HSRP groups are configured for the second router, it is determined to send the redirect packet to the primary IP address of the second router.

12. A first router that supports a virtual router protocol, the first router being adapted for sending a redirect packet to a host, the redirect packet notifying the host that packets to be sent to a particular network are to be redirected to a second router, comprising:

a processor; and a memory, at least one of the processor and the memory being adapted for:

determining whether to send a redirect packet to a primary IP address of the second router or to a virtual IP address of the second router, the virtual IP address being associated with one or more routers;

when it is determined to send a redirect packet to the primary IP address of the second router, composing a redirect packet indicating that packets to be sent to a specific network are to be redirected to the primary IP address of the second router and sending the redirect packet to the host; and when it is determined to send a redirect packet to the virtual IP address of the second router, composing a redirect packet indicating that packets to be sent to the specific network are to be redirected to the virtual IP address of the second router and sending the redirect packet to the host;

wherein determining whether to send a redirect packet to a primary IP address of the second router or to a virtual IP address of the second router comprises:

performing a lookup in a virtual router table for the primary IP address of the second router;

determining from the virtual router table whether one or more HSRP groups are configured for the second router; and when it is determined that no HSRP groups are configured for the second router, it is determined to send a redirect packet to the primary address of the second router.

13. A first router that supports a virtual router protocol, the first router being adapted for sending a redirect packet to a host, the redirect packet notifying the host that packets to be sent to a particular network are to be redirected to a second router, comprising:

a processor; and a memory, at least one of the processor and the memory being adapted for:

determining whether to send a redirect packet to a primary IP address of the second router or to a virtual IP address of the second router, the virtual IP address being associated with one or more routers;

when it is determined to send a redirect packet to the primary IP address of the second router, composing a redirect packet indicating that packets to be sent to a specific network are to be redirected to the primary IP address of the second router and sending the redirect packet to the host; and when it is determined to send a redirect packet to the virtual IP address of the second router, composing a redirect packet indicating that packets to be sent to the specific network are to be redirected to the virtual IP address of the second router and sending the redirect packet to the host;

wherein determining whether to send a redirect packet to a primary IP address of the second router or to a virtual IP address of the second router comprises:

performing a lookup in a virtual router table for the primary IP address of the second router; and determining whether the second router is an active router for the virtual router protocol.

14. The first router as recited in claim 13, wherein when it is determined that the second router is an active router for the virtual router protocol, it is determined to send the redirect packet to a virtual address of the second router.

15. The first router as recited in claim 14, wherein composing a redirect packet when it is determined to send the redirect packet to a virtual address of the second router comprises:

obtaining one of one or more virtual IP addresses associated with the primary IP address of the second router; and composing a redirect packet including the obtained virtual IP address associated with the primary IP address of the second router.

16. The first router as recited in claim 13, wherein when it is determined that the second router is not an active router for the virtual router protocol, it is determined that a redirect packet is not to be sent to the host.

* * * * *